United States Patent
Ito et al.

(10) Patent No.: US 6,707,654 B2
(45) Date of Patent: Mar. 16, 2004

(54) PROTECTION DEVICE THAT SHUTS OFF IN CASE OF REVERSED CONNECTION

(75) Inventors: Masayasu Ito, Shizuika-ken (JP); Hitoshi Takeda, Shizuoka-ken (JP)

(73) Assignee: Koito Manufacturing Co., Ltd. (JP)

( * ) Notice: Subject to any disclaimer, the term of this patent is extended or adjusted under 35 U.S.C. 154(b) by 29 days.

(21) Appl. No.: 10/113,510

(22) Filed: Apr. 1, 2002

(65) Prior Publication Data

US 2002/0141124 A1 Oct. 3, 2002

(30) Foreign Application Priority Data

Apr. 2, 2001 (JP) ........................................ 2001-103755

(51) Int. Cl.[7] ............................................... H02H 7/00
(52) U.S. Cl. .......................... 361/58; 361/18; 361/93.9; 361/100
(58) Field of Search ........................... 361/18, 58, 93.9, 361/100

(56) References Cited

U.S. PATENT DOCUMENTS

| | | | | |
|---|---|---|---|---|
| 4,642,746 A | * | 2/1987 | Losel ........................... | 363/49 |
| 5,068,570 A | | 11/1991 | Oda et al. ..................... | 315/128 |
| 5,519,557 A | * | 5/1996 | Kopera et al. ............... | 361/184 |
| 5,596,465 A | * | 1/1997 | Honda et al. ................. | 361/18 |

FOREIGN PATENT DOCUMENTS

| JP | 6-348350 | 12/1994 | |
|---|---|---|---|
| JP | 10-315849 | 12/1998 | ............ B60Q/1/04 |

* cited by examiner

*Primary Examiner*—Bao Q. Vu
(74) *Attorney, Agent, or Firm*—Rosenthal & Osha L.L.P.

(57) ABSTRACT

A protection device arranged on an electric current path between a load unit including a stabilized power supply unit and a DC power supply, includes: a switching unit including an FET having a source terminal and a drain terminal arranged on an electric current path between the DC power supply and the load unit; and an input end to which a voltage generated by the stabilized power supply circuit in the load unit as a control voltage, the control voltage being capable of turning on the FET in a case of forward connection in which a positive input terminal of the load unit is connected to an anode of the DC power supply and a negative input terminal of the load unit is connected to a cathode of the DC power supply, and turning off the FET in a case of reversed connection in which the positive input terminal of the load unit is connected to the cathode of the DC power supply and the negative input terminal of the load unit is connected to the anode of the DC power supply, wherein the control voltage is applied to a gate terminal of the FET via the input end.

7 Claims, 4 Drawing Sheets

PROTECTION DEVICE THAT SHUTS OFF IN CASE OF REVERSED CONNECTION

This patent application claims priority from a Japanese patent application No. 2001-103755 filed on Apr. 2, 2001, the contents of which are incorporated herein by reference.

BACKGROUND OF THE INVENTION

1. Field of the Invention

The present invention relates to a protection device. More particularly, the present invention relates to a protection device capable of preventing a problem that may be caused by connecting a DC power supply to a load erroneously with a reversed polarity.

2. Description of the Related Art

In an electrical apparatus, a load is made to operate in a forward connection state, i.e., a forward polarity connection, in which a positive input terminal of the load connects to an anode of a DC power supply while a negative input terminal connects to a cathode thereof. For example, a transformer is used in a vehicular apparatus as an example of the electrical apparatus. A voltage of an on-vehicle battery (an example of the DC power supply) that is connected to the primary side of the transformer by forward connection is changed to a higher voltage on the secondary side, thereby turning on a vehicular headlight.

On the other hand, the DC power supply and the load may be connected by a reversed connection, i.e., a reverse polarity connection, in which the positive input terminal of the load is connected to the cathode of the DC power supply and the negative input terminal of the load is connected to the anode of the DC power supply. This is, for example, a case where the on-vehicle battery is connected by the reversed polarity connection. In such a case, there would cause serious problems in, for example, breakdown of a circuit and meltdown of a fuse in the load.

Thus, in the conventional electrical apparatus, a protection device is arranged on an electric current path between the DC power supply and the load. The protection device has a switching portion that is turned on in the case of forward connection and turned off in the case of reversed connection, thereby preventing the aforementioned problems when the load is connected to the DC power supply by reversed connection, as disclosed, for example, in Published Japanese Patent Application Laid-Open No. 10-315849.

The protection device disclosed in Japanese Patent Application Laid-Open No. 10-315849 uses an FET or Field Effect Transistor as the switching portion and applies a control voltage to a gate of the FET from the anode of the DC power supply via a resistor.

When a large voltage such as a surge voltage is applied to the anode terminal of the DC power supply, this surge voltage may exceed the withstand voltage of the gate so as to damage the FET. Thus, the damage of the FET is prevented by means of a protection circuit including a capacitor or a Zener diode. For example, the protection device disclosed in Japanese Patent Application Laid-Open No. 10-315849 has a protection circuit including a capacitor.

However, in the conventional protection device, a large number of parts or components are newly required in order to supply the control voltage for controlling on/off of the FET to the gate terminal of the FET and the like and, therefore, would raise the manufacturing cost for the electric apparatus.

SUMMARY OF THE INVENTION

Therefore, it is an object of the present invention to provide a protection device, which is capable of overcoming the above drawbacks accompanying the conventional device. The above and other objects can be achieved by combinations described in the independent claims. The dependent claims define further advantageous and exemplary combinations of the present invention.

According to the first aspect of the present invention, a protection device arranged on an electric current path between a load unit including a stabilized power supply unit and a DC power supply, comprises: a switching unit including an FET having a source terminal and a drain terminal arranged on an electric current path between the DC power supply and the load unit; and an input end to which a voltage generated by the stabilized power supply circuit in the load unit as a control voltage, the control voltage being capable of turning on the FET in a case of forward connection in which a positive input terminal of the load unit is connected to an anode of the DC power supply and a negative input terminal of the load unit is connected to a cathode of the DC power supply, and turning off the FET in a case of reversed connection in which the positive input terminal of the load unit is connected to the cathode of the DC power supply while the negative input terminal is connected to the anode thereof, wherein the control voltage is applied to a gate terminal of the FET via the input end.

The switching unit may be arranged at one of the positive input terminal and negative input terminal, the one terminal being a reference potential of the load unit.

The FET may be an n-channel type MOS-FET; the n-channel type MOS-FET may be arranged on the electric current path at one of the positive input terminal and the negative input terminal, that is a reference potential of the load unit; the drain terminal of the n-channel MOS-FET may be arranged at a polarity side of the DC power supply, the polarity side being the referential potential of the load unit, and the source terminal is arranged on the load unit side; and a parasitic diode may be formed between the source terminal and the drain terminal of the n-channel type MOS-FET in such a manner that a direction from the source terminal to the drain terminal is a forward direction.

The stabilized power supply circuit may be a series regulator operable to change an input DC voltage to a stabilized output DC voltage lower than the input DC voltage and to output the stabilized output DC voltage, and the output DC voltage of the series regulator may be applied to the input end as the control voltage.

The stabilized power supply circuit maybe a series regulator operable to change an input DC voltage to a stabilized output DC voltage and to output the stabilized output DC voltage; a resistor may be arranged between the input end and the gate terminal of the FET; and the output DC voltage of the series regulator may be applied to the input end as the control voltage.

The stabilized power supply circuit may be a switching regulator operable to change an input DC voltage to a stabilized output voltage to output the stabilized output voltage; the load unit further may include a sub-DC power supply unit operable to generate a DC voltage having a different magnitude from the output DC voltage in accordance with the output DC voltage of the switching regulator; the input end and the gate terminal of the FET may be directly connected to each other, and the DC voltage generated by the sub-DC power supply may be applied to the input end as the control voltage.

The stabilized power supply circuit may be a switching regulator operable to change an input DC voltage to a stabilized output DC voltage and to output the stabilized output DC voltage; the load unit further may include a sub-DC power supply operable to generate a DC voltage having a different magnitude from the output DC voltage in accordance with the output DC voltage of the switching regulator,; a resistor may be arranged between the input end and the gate terminal of the FET; and the DC voltage generated by the sub-DC power supply may be applied to the input end as the control voltage.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1A:
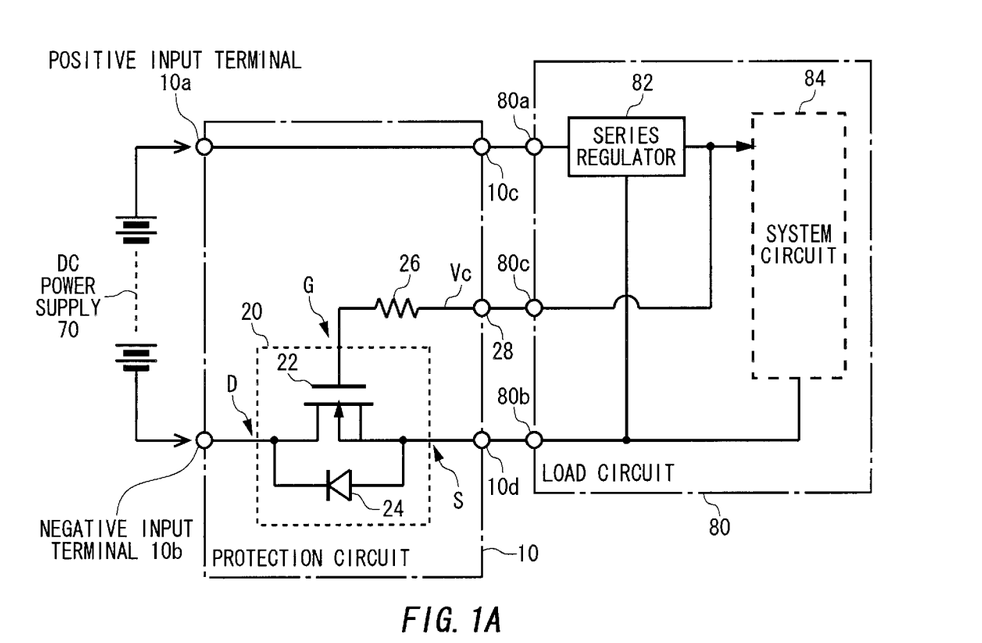
FIGS. 1A and 1B are circuit diagrams showing an electrical apparatus including a protection device according to an embodiment of the present invention.
Figure 1B:
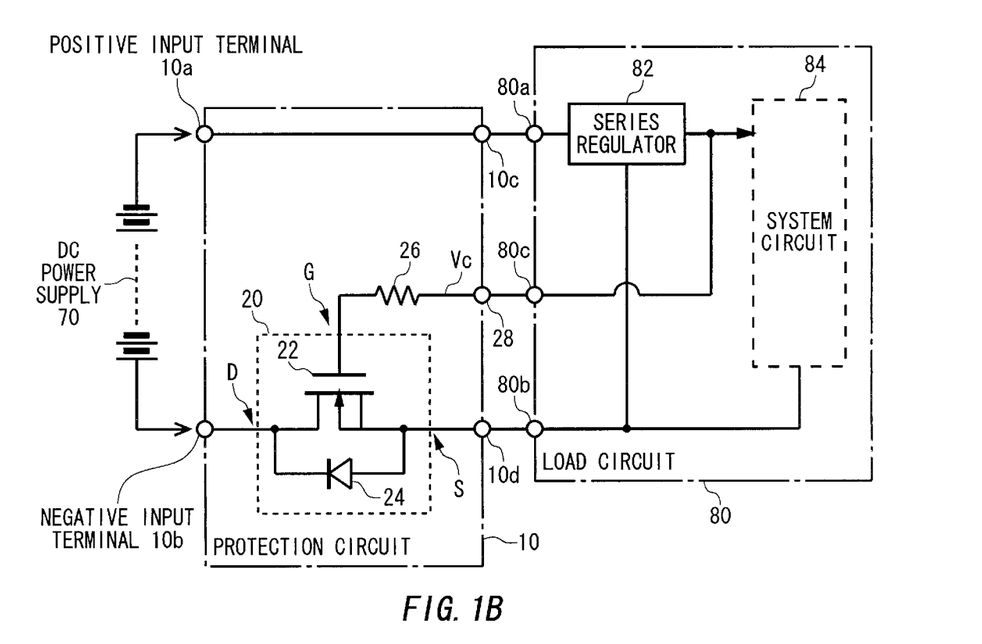

FIGS. 1A and 1B are circuit diagrams showing an exemplary electronic device having a protection device 10 according to an embodiment of the present invention. The embodiment shown in FIGS. 1A and 1B is called as the first embodiment. On an electric current path between a DC power supply 70 and a load circuit 80 serving as a load unit, the protection device 10 is arranged in order to prevent a problem that may be caused by reversed connection of the DC power supply 70 and the load circuit 80.

The load circuit 80 includes a series regulator 82 as an example of a stabilized power supply circuit (DC-DC converter in a broad sense) and a system circuit 840. The series regulator 82 changes an input DC voltage to a stabilized output voltage lower than the input DC voltage, and supplies the stabilized output voltage to the system circuit 840.

The protection device 10 includes: a switching portion 20 having an n-channel type MOS FET 22 (hereinafter, simply referred to as an nMOS 22) having a source terminal S and a drain terminal D provided on the electric current path between the DC power supply 70 and the load circuit 80; a diode 24 arranged electrically in parallel to the nMOS 22; an input end 28 to which a control voltage Vc is output from the load circuit 80, and a resistor 26 connected to the input end 28 at one end and to a gate terminal G of the nMOS 22 at the other end.

The protection device 10 has a positive input terminal 10a, a negative input terminal 10b, a positive output terminal 10c and a negative output terminal 10d. The source terminal S of the nMOS 22 is connected to a negative input terminal 80b of the series regulator 82, at which a reference voltage is provided, via the negative output terminal 10d, while the drain terminal D is connected to the DC power supply 70 via the negative input terminal 10b. The positive input terminal 10a is connected to the DC power supply 70. The positive output terminal 10c is connected to a positive input terminal 80a of the load circuit 80. The positive input terminal 10a and the positive output terminal 10c are connected directly to each other in the protection device 10.

FIG. 1A shows a state of forward connection, where the positive input terminal 80a of the load circuit 80 is connected to an anode (+) of the DC power supply 70 via the positive input terminal 10a and the positive output terminal 10c of the protection device 10, while the negative input terminal 80b of the load circuit 80 is connected to a cathode (−) of the DC power supply 70 via the negative output terminal 10d, the switching portion 20, and the negative input terminal 10b of the protection circuit 10. On the other hand, FIG. 1B shows a state of reversed connection, where the positive input terminal 80a of the load circuit 80 is connected to the cathode of the DC power supply 70 via the positive input terminal 10a and the positive output terminal 10b of the protection device 10, while the negative input terminal 80b of the load circuit 80 is connected to the anode of the DC power supply 70 via the negative output terminal 10d, the switching portion 20 and the negative input terminal 10b of the protection circuit 10.

The diode 24 is a parasitic diode arranged between the source terminal S and the drain terminal D of the nMOS 22 in such a manner that a direction from the source terminal S to the drain terminal D is a forward direction. Thus, with respect to a direct current flow, the arrangement of the diode 24 is in the forward direction when the DC power supply 70 and the load circuit 80 are connected to each other by a forward connection, whereas the arrangement of the diode 24 turns to be in the reversed direction when they are connected by the reversed connection.

An output DC voltage of the series regulator 82 is input as the control voltage Vc to the gate terminal G of the nMOS 22 via an output end 80c, the input end 28 and the resistor 26.

When the power is turned on in the case of forward connection, a direct current flows from the DC power supply 70 to the load circuit 80 via the diode 24 even if the nMOS 22 is not turned on. The series regulator 82 is then activated and therefore the output DC voltage having a predetermined magnitude (larger than 0 V) is output from the series regulator 82. By application of this output voltage to the gate terminal G of the nMOS 22 as the control voltage Vc, the nMOS 22 is turned on to short-circuit the drain and source terminals of the nMOS 22. On the other hand, in the case of reversed connection, the arrangement of the diode 24 turns to be in the reversed direction with respect to the direct current flow. Thus, the direct current does not flow from the DC power supply 70 to the load circuit 80. As a result, the series regulator 82 is not activated, thus making the output DC voltage be approximately 0 V. Therefore, the nMOS 22 is not turned on.

In other words, when the output DC voltage of the series regulator 82 is connected to the DC power supply 70 by forward connection via the protection device 10, the nMOS 22 is turned on. On the other hand, when the load circuit 80 is connected to the DC power supply 70 by reversed connection via the protection device 10, the output DC voltage of the series regulator 82 is applied to the input end 28 of the protection device 10 as the control voltage Vc for turning the nMOS 22 off. Thus, it is possible to prevent the problem occurring in the load circuit 80 in the case of reversed connection.

The series regulator 82 outputs the output DC voltage for making the system circuit 840 connected to the series regulator 82 operate. Thus, the series regulator 82 is formed by various circuit structures including a three-terminal regulator device, an emitter follower of transistor and the like. In a case of forming the series regulator 82 by any structure, a smoothing capacitor (also called as a decoupling capacitor, not shown) is provided between the output terminal of the series regulator 82 and the reference potential (for example, GND) in accordance with an average or an instantaneous electric consumption by the system circuit 840. Thus, in a stationary operation state where the DC power supply 70 is connected to the protection device 80 by forward connection, the series regulator 82 holds the output DC voltage having a certain magnitude or larger even in a case of a transitional state where the minus serge is applied.

When this output DV voltage is applied to the input end 28 as the control voltage Vc, the nMOS 22 is turned on in the case of forward connection, so that the drain and source terminals of the nMOS 22 are short-circuited. Thus, no additional circuit for supplying the control voltage Vc to the gate terminal G of the nMOS 22 is basically required.

Moreover, in a case where the electrical apparatus is for vehicle and the system circuit 840 is a lighting circuit for lighting a headlight on vehicle, the lighting circuit is provided with an alternator in parallel with the headlight, in addition to the headlight. This alternator is arranged so as to allow a field current to flow through a field coil when an ignition switch is turned on. A lighting switch can be turned on by a driver's operation, for example. However, immediately after the ignition switch has been turned off while the headlight is being lighted, a large voltage having a reversed polarity, i.e., a negative polarity (a short-term large induced minus serge) is generated for a moment on the positive side of an in-vehicle battery by the field coil of the alternator that has quite large reactance.

However, according to the first embodiment, since the series regulator 82 holds the output DC voltage having a certain magnitude or larger even in the case where the minus server is applied described above, the nMOS 22 is kept on. Thus, a capacitor for protection, for example, described in Japanese Patent Application Laying-Open No. 10-315849 is not required.

Moreover, when an FET is turned on in a case where the minus surge is applied to the FET, a large voltage is applied between the source and drain terminals of the FET. Thus, it is generally necessary that the switching portion 20 includes an FET having a large drain-source withstand voltage. However, if the nMOS 22 is kept on during a short period in which the minus surge is applied as described above, the smoothing capacitor provided at the output terminal of the series regulator 82 can absorb the surge energy. Moreover, in a case where the system circuit 840 includes a device for absorbing the surge energy, this device absorbs the surge energy. Thus, it is not necessary that the nMOS 22 of the present embodiment has a large drain-source withstand voltage.

The breakdown of the FET is caused mostly by short circuit, especially short circuit among all the terminals including the gate, drain and source. With no resistor between the output of the series regulator 82 and the gate terminal G of the nMOS 22, the output voltage of the series regulator 82 may be drawn to the cathode (−) side of the DC power supply 70 (GND-side of the load circuit 80) so as to make the load circuit 80 (the entire system of the electrical apparatus) inoperative. However, since the control voltage Vc is applied to the gate terminal G via the resistor 26 in the protection device 10 of the present embodiment, the operation of the entire system can be kept normal even if the nMOS 22 is broken and therefore the gate terminal G is short-circuited to the cathode (−) side of the DC power supply 70 by some reasons including the surge by the vehicle. In other words, since the load circuit 80 is made to operate by short-circuiting the drain and source terminals of the FET in the case of forward connection, the operation of the system in the case of forward connection has no problem practically, even if the breakdown of the FET occurs.

On the other hand, the protection device 10 is provided in order to prevent the problem caused when the DC power supply 70 is connected to the load circuit 80 by reversed connection. Therefore, when the breakdown of the FET occurred, the protection device 10 has no function with regard to the protection in the case of reversed connection. However, the protection in the case of reversed connection is to be done for avoiding adverse effects of a connection error on the system or vehicle in a case where the connection error occurred in a process of installing the DC power supply 70 on the vehicle. Therefore, the protection in the case of reversed connection is not necessary after the installation of the DC power supply 70 on the load circuit 80 (for example, the vehicle) was finished. Thus, by applying the DC voltage as the control voltage Vc to the gate terminal G of the FET from the series regulator 82 via the resistor 26, the breakdown of the system with respect to the FET breakdown caused by the surge after the installation on the vehicle does not occur, thereby contributing to the reduction of proportion defective.

Figure 2A:
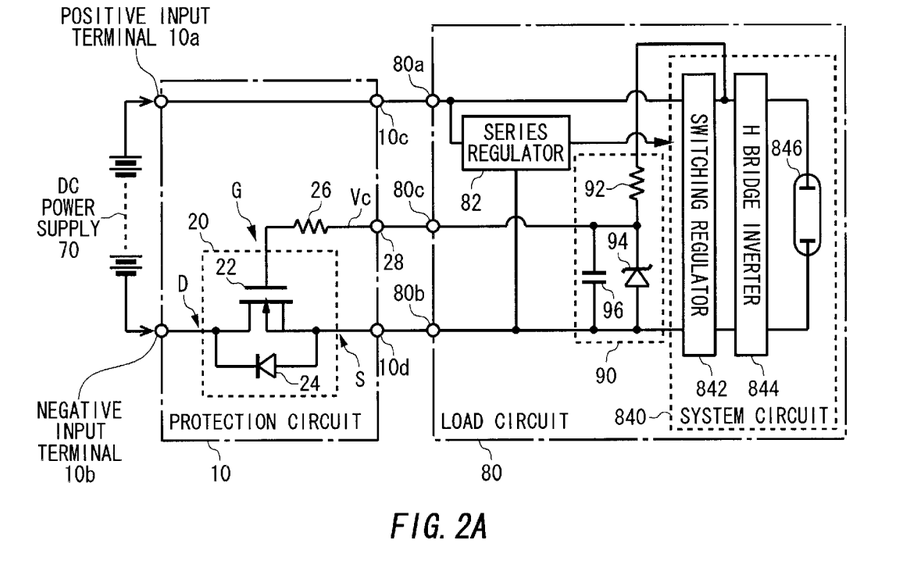
FIGS. 2A and 2B are circuit diagrams showing an electrical apparatus including a protection device according to another embodiment of the present invention.
Figure 2B:
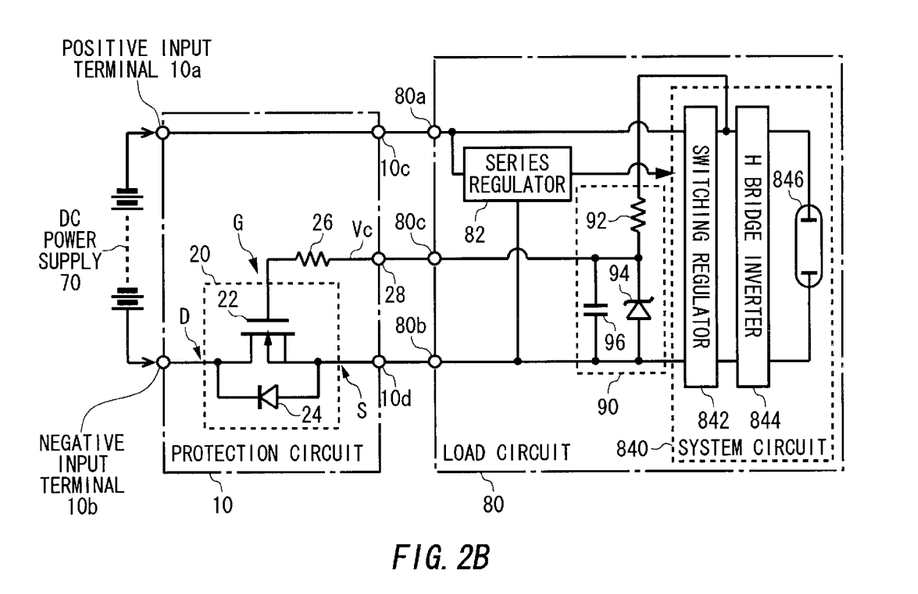

FIGS. 2A and 2B show another exemplary electrical apparatus including a protection device according to an embodiment of the present invention. The embodiment shown in FIGS. 2A and 2B is called as the second embodiment. In the second embodiment, the protection apparatus 10 is different from that in the first embodiment in that the DC voltage is used as the control voltage Vc generated by a sub-DC power supply 90 provided inside of the load circuit 80.

The load circuit 80 includes the sub-DC power supply 90 in addition to the series regulator 82 and the system circuit 840. To the system circuit 840, the output voltage of the series regulator 82 is supplied. The system circuit 840 includes a switching regulator (DC-DC converter in the narrow sense) 842 connected to the positive input terminal 80a and a negative input terminal 80b at an input end, an H bridge inverter 844 connected to an output end of the switching regulator 842 and a discharge lamp 846 connected to an output end of the H bridge inverter 844. The switching regulator 842 is an example of a stabilized power supply circuit for changing the input DC voltage to a stabilized output DC voltage and outputting the stabilized output DC voltage. More specifically, the switching regulator 842 increases a DC voltage input from the positive input terminal 80a.

The sub-DC power supply 90 includes: a resistor 92 connected to the output of the switching regulator 842 at one end; a Zener diode 94 having a cathode terminal connected to the other end of the resistor 92 and an anode terminal connected to the negative input terminal 80b as a reference potential side of the series regulator 82 and the switching regulator 842; and a decoupling capacitor 96 connected in parallel to the Zener diode 94. A connection point at which the cathode terminal of the Zener diode 94 and the resistor 92 are connected is connected to the output end 80c, and the capacitor 96 is arranged between the negative input terminal 80b and the output end 80c. According to this arrangement, the sub-DC power supply 90 generates a DC voltage having a predetermined magnitude at the cathode terminal of the Zener diode 94 in accordance with the output DC voltage of the switching regulator 42. This DC voltage is, for example, a voltage having a magnitude different from that of the output DC voltage of the switching regulator 842 (more specifically, the smaller voltage).

In a case where the system circuit 840 is used as a lighting circuit including a switching device having bridge connection (hereinafter, a bridge structure) and is provided with the H bridge inverter 844 and the discharge lamp 846, so that the system circuit 840 is used for lighting a discharge lamp on vehicle, the switching regulator 842 may be an exclusive power source provided for keeping the discharge lamp 846 lighting even when the battery voltage becomes lower. In this case, the output voltage generated by the switching regulator 842 is applied to a bridge drive IC and the bridge structure in the H bridge inverter 844 forming the lighting circuit.

The sub-DC power supply 90 cooperates with the switching regulator 842 so as to generate a Zener voltage (DC voltage) at the cathode terminal of the Zener diode 94. This Zener voltage is applied as the control voltage Vc to the input end 28 of the protection device 10. This control voltage Vc is input to the gate terminal G of the nMOS 22 via the resistor 26.

In the case where the system circuit 840 has the lighting circuit as described above, the bridge drive IC and the bridge structure do not consume the electric current so much. Thus, if the output voltage of the switching regulator 42 becomes lower (for example, to reach 0 V), the Zener voltage of the sub-DC power supply 90 does not fall suddenly. Therefore, the protection device 10 of the second embodiment can operate in substantially the same manner as that of the first embodiment and can obtain substantially the same effects as in the first embodiment, for example, that the protection device 10 can keep the nMOS 22 on when the minus surge is applied.

Figure 3A:
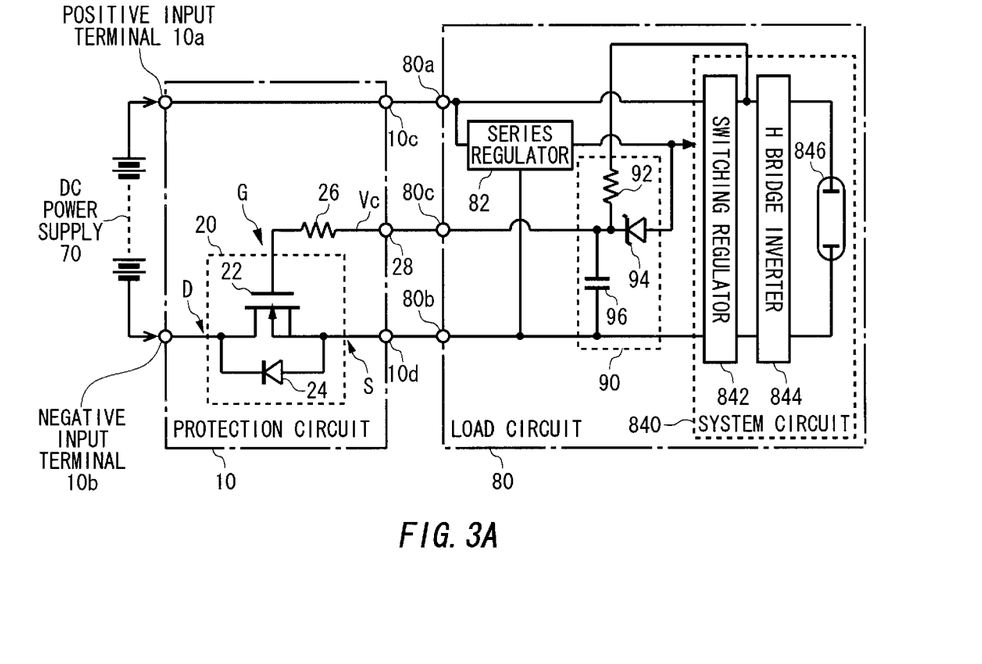
FIGS. 3A and 3B are circuit diagrams showing an electrical apparatus including a protection device according to still another embodiment of the present invention.
Figure 3B:
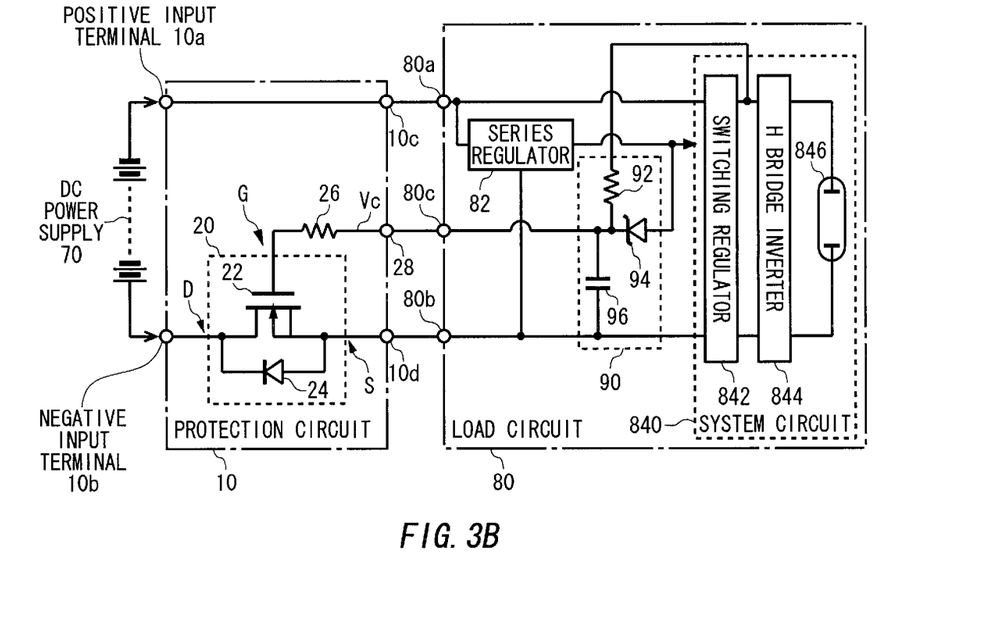

FIGS. 3A and 3B are circuit diagrams showing another exemplary electrical apparatus including a protection device according an embodiment of the present invention. The embodiment shown in FIGS. 3A and 3B is called as the third embodiment. In the third embodiment, the protection apparatus 10 is different from that in the second embodiment in a manner of connection of the Zener diode 94 provided in the sub-DC power supply 90.

As shown in FIGS. 3A and 3B, the anode terminal of the Zener diode 94 is connected to the output of the series regulator 82. The decoupling capacitor 96 is arranged between the negative input terminal 80b and the output end 80c. As in the present embodiment, the output voltage of the sub-DC power supply 90 can be regulated. Therefore, the protection device 10 of the third embodiment can operate in substantially the same manner as that of the second embodiment, and can obtain substantially the same effect as that obtained in the second embodiment.

The connection manner of the anode terminal of the Zener diode 94 is not limited to the examples described in the second and third embodiments. The anode terminal of the Zener diode 94 may be connected any portion as long as the output voltage of the sub-DC power supply 90 can be regulated. In such modifications, it is preferable that the decoupling capacitor 96 be arranged between the negative input terminal 80b and the output end 80c.

Figure 4A:
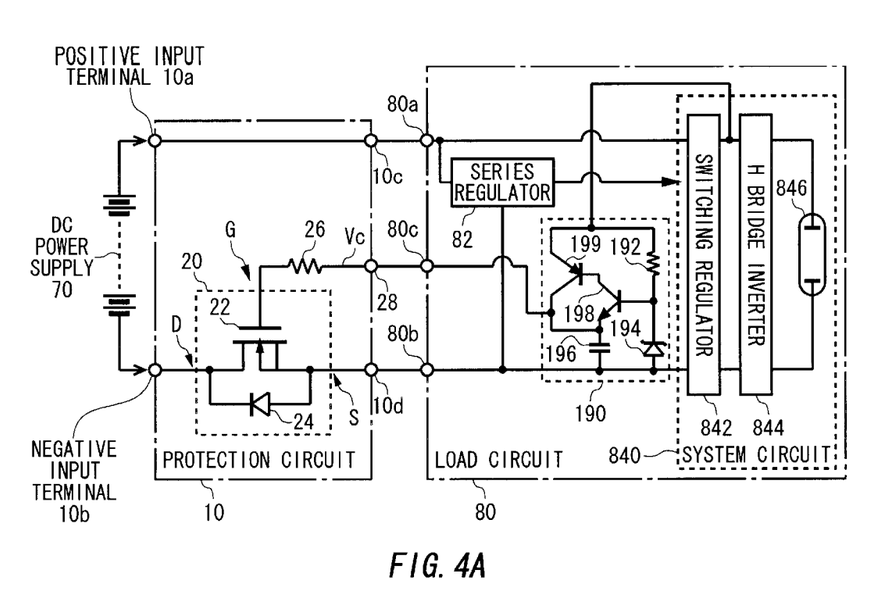
FIGS. 4A and 4B are circuit diagrams showing an electrical apparatus including a protection device according to still another embodiment of the present invention.
Figure 4B:
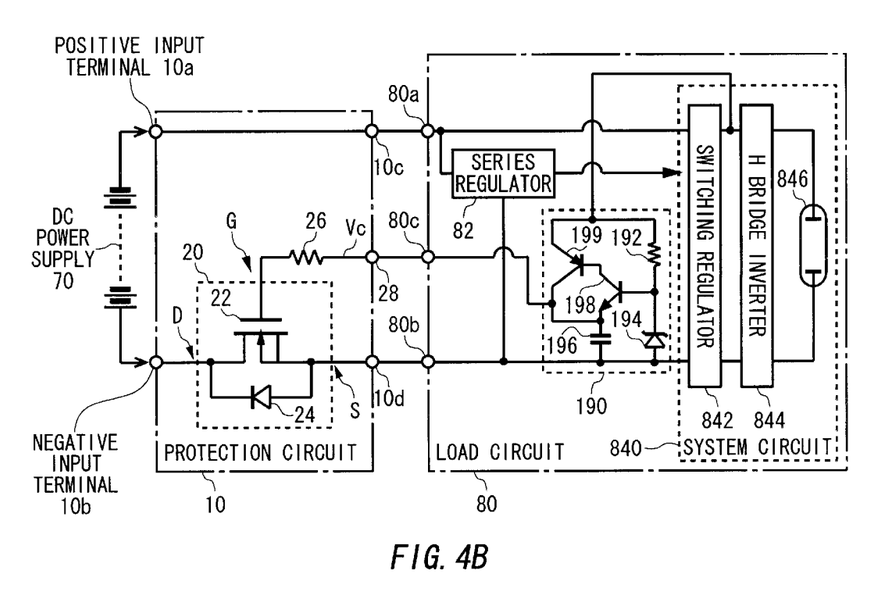

FIGS. 4A and 4B are circuit diagrams showing another exemplary electrical apparatus including a protection device according to an embodiment of the present invention. The embodiment shown in FIGS. 4A and 4B is called as the fourth embodiment. In the fourth embodiment, the protection device 10 is different from that in the second embodiment in the arrangement of the sub-DC power supply provided in the load circuit 80.

The load circuit 80 includes a sub-DC power supply 190 in place of the sub-DC power supply 90 in the second embodiment. The sub-DC power supply 190 includes a resistor 192 connected to the output of the switching regulator 842 at an end, a Zener diode 194 having an anode terminal connected to the negative input terminal 80b as the reference potential side of the series regulator 82 and switching regulator 842, a decoupling capacitor 196 and two transistors 198 and 199 connected to each other by Darlington connection.

A base terminal of the npn transistor 198 is connected to the cathode terminal of the Zener diode 194; a collector terminal is connected to a base terminal of the pnp transistor 199; and an emitter terminal is connected to a collector terminal of the transistor 199 and an end of the capacitor 196. An emitter terminal of the transistor 199 is connected to the output of the switching regulator 842. A connection point at which the emitter terminal of the transistor 198 and the collector terminal of the transistor 199 are connected is connected to the output end 80c. The decoupling capacitor 196 is arranged between the negative input terminal 80b and the output end 80c. According to this arrangement, the sub-DC power supply 190 generates a DC voltage having a different magnitude from the output DC voltage of the switching regulator 842 (for example, the smaller DC voltage than the output DC voltage) in accordance with the output DC voltage of the switching regulator 842, at the collector terminal of the transistor 199. The protection device 10 of the fourth embodiment is different from that of the second embodiment only in that the arrangement of the sub-DC power supply 190 is different from that of the sub-DC power supply 90, as described above, and can operate in substantially the same manner as that in the second embodiment and can obtain substantially the same effect as that obtained in the second embodiment.

The anode terminal of the Zener diode 194 may be connected to the output of the series regulator 82, as in the third embodiment. Moreover, the anode terminal of the Zener diode 194 maybe connected to any portion as long as the output voltage of the sub-DC power supply 190 can be regulated. In such modifications, it is preferable that the decoupling capacitor 196 be arranged between the negative input terminal 80b and the output end 80c.

In addition, the switching portion 20 may include other FET than the nMOS 22. In a case where the diode existing in the FET cannot be used, a separate FET may be arranged in parallel to the FET. Moreover, the output DC voltage from the series regulator 82 may be applied as the control voltage Vc directly to the gate terminal G of the FET, not via the resistor 26.

Furthermore, a portion where the switching portion 20 is arranged is not limited to the negative input terminal side of the series regulator 82, that serves as the reference potential side. The switching portion 20 may be arranged on the positive input terminal side.

As described above, according to the present invention, the protection for the reversed connection can be realized with the reduced number of parts. Moreover, it is not necessary that the FET in the switching portion has a large drain-source withstand voltage.

Although the present invention has been described by way of exemplary embodiments, it should be understood that those skilled in the art might make many changes and substitutions without departing from the spirit and the scope of the present invention which is defined only by the appended claims.

What is claimed is:

1. A protection device arranged on an electric current path between a power supply and a load unit including a stabilized power supply unit adapted to receive a voltage from the power supply, comprising:

a switching unit including an FET having a source terminal and a drain terminal arranged on an electric current path between said power supply and the load unit; and an input end to which a voltage generated by the stabilized power supply circuit of the load unit is input as a control voltage, said control voltage turning on said FET in a case of forward connection in which a positive input terminal of the load unit connects to an anode of said power supply and a negative input terminal of the load unit connects to a cathode of said power supply, and turning off said FET in a case of reversed connection in which the positive input terminal of the load unit connects to said cathode of said power supply and said negative input terminal of the load unit connects to the anode of the power supply, said control voltage being applied to a gate terminal of said FET via said input end.

2. A protection device as claimed in claim 1, wherein said switching unit is arranged at one of said positive input terminal and negative input terminal, said one terminal being a reference potential of the load unit.

3. A protection device as claimed in claim 1, wherein said FET is an n-channel type MOS-FET, said n-channel type MOS-FET is arranged on said electric current path at one of said positive input terminal and said negative input terminal, that is a reference potential of the load unit, said drain terminal of said n-channel MOS-FET is arranged at a polarity side of said power supply, said polarity side being said referential potential of the load unit, and said source terminal is arranged on the load unit side, and a parasitic diode is formed between said source terminal and said drain terminal of said n-channel type MOS-FET in such a manner that a direction from said source terminal to said drain terminal is a forward direction.

4. A protection device as claimed in claim 1, wherein the stabilized power supply circuit is a series regulator operable to change an input DC voltage to a stabilized output DC voltage lower than said input DC voltage and to output said stabilized output DC voltage, and said output DC voltage of said series regulator is applied to said input end as said control voltage.

5. A protection device as claimed in claim 1, wherein said stabilized power supply circuit is a series regulator operable to change an input DC voltage to a stabilized output DC voltage and to output said stabilized output DC voltage, a resistor is arranged between said input end and said gate terminal of said FET, and said output DC voltage of said series regulator is applied to said input end as said control voltage.

6. A protection device as claimed in claim 1, wherein said stabilized power supply circuit is a switching regulator operable to change an input DC voltage to a stabilized output voltage to output said stabilized output voltage, the load unit further includes a sub-power supply unit operable to generate a DC voltage having a different magnitude from said output DC voltage in accordance with said output DC voltage of said switching regulator, said input end and said gate terminal of said FET is directly connected to each other, and said DC voltage generated by said sub-power supply is applied to said input end as said control voltage.

7. A protection device as claimed in claim 1, wherein said stabilized power supply circuit is a switching regulator operable to change an input DC voltage to a stabilized output DC voltage and to output said stabilized output DC voltage, the load unit further includes a sub-power supply operable to generate a DC voltage having a different magnitude from said output DC voltage in accordance with said output DC voltage of said switching regulator, a resistor is arranged between said input end and said gate terminal of said FET, and said DC voltage generated by said sub-power supply is applied to said input end as said control voltage.

* * * * *

UNITED STATES PATENT AND TRADEMARK OFFICE
CERTIFICATE OF CORRECTION

PATENT NO.    : 6,707,654 B2
DATED         : March 16, 2004
INVENTOR(S)   : Masayasu ITO et al.

It is certified that error appears in the above-identified patent and that said Letters Patent is hereby corrected as shown below:

<u>Title page,</u>
Item [56], References Cited, FOREIGN PATENT DOCUMENTS, please insert
-- JP    1-166438  11/1989 --.

Signed and Sealed this

Thirteenth Day of July, 2004

JON W. DUDAS
*Acting Director of the United States Patent and Trademark Office*